United States Patent Office 3,432,449
Patented Mar. 11, 1969

3,432,449
FOAMABLE PLASTISOL COMPOSITION AND METHOD OF FOAMING SAME
Kenneth M. Deal, Norwalk, and Raymond R. Waterman, Monroe, Conn., assignors to R. T. Vanderbilt Company, Inc., New York, N.Y., a corporation of New York
No Drawing. Filed Aug. 11, 1966, Ser. No. 571,724
U.S. Cl. 260—2.5      24 Claims
Int. Cl. C08f 47/08

ABSTRACT OF THE DISCLOSURE

The invention relates to an unfoamed plastisol composition comprising polyvinyl chloride, a plasticizer, an organic non-soap surfactant and a foam stabilizer selected from the group consisting of potassium acid phthalate, sodium acid phthalate and sodium phthalate, and the method of foaming said composition.

---

The present invention relates to a process for producing polyvinyl chloride foam and to compositions for use therein.

Polyvinyl chloride foam or sponge, whether open cell or closed cell, is produced from a plastisol by expanding or foaming the plastisol and then heating it to gel and fuse the expanded or cellular structure. The foam is generally produced by one of three methods. In the compressed gas method, a gas, such as carbon dioxide or nitrogen, is dissolved in the plastisol under pressure. Upon release of the pressure, the dissolved gas expands in the plastisol to form the plastisol into a closed cell vinyl sponge. A further process involves the use of chemical blowing agents which decompose in the plastisol to release a gas, such as nitrogen, within the plastisol to form the foam or sponge. The remaining major method for forming polyvinyl chloride foam involves the mechanical beating or frothing of a plastisol to incorporate air therein.

The major drawbacks to the compressed gas method are that it requires the use of comparatively expensive bottled gases, expensive refrigeration equipment for precise low temperature control and complicated high pressure machinery. The use of chemical blowing agents is disadvantageous, because these agents are expensive and the process is difficult to control. In general the mechanical beating process is unsatisfactory for light density foams, because the foamed plastisol tends to collapse or coarsen prior to or during fusion thereof.

There have recently been developed mechanical beating processes for the production of polyvinyl chloride foam wherein there is no collapse of the foam so that the resulting foam has a fine, uniform, open cell structure. These processes and products, which are dependent upon the presence of either an alkali metal soap and water or an alkali metal soap, an amine soap and water in the plastisol prior to the frothing or beating thereof to form the foam, have proved to be highly satisfactory. However, these processes do not have universal applicability in that they cannot be satisfactorily used for the preparation of foams which are to be formed between two vapor impermeable surfaces or layers due to the presence of significant amounts of water which is liberated during gelling and fusing. Moreover, they cannot be used for the formation of acceptable foams in thin sections due to foam collapse. These processes also require uniform heating and rather careful control thereof during the gelling and fusing operations.

Accordingly, it is an object of the present invention to provide a process for the production of polyvinyl chloride foam and compositions for use therein such that the foams can be satisfactorily formed between two vapor impermeable surfaces or layers, such as between paper, plastic or treated fabric, or in closed molds. It is a further object of the present invention to provide a process for the production of polyvinyl chloride foam and compositions for use therein so that acceptable foams can be formed in thin sections ranging between 15 and 45 mils in thickness without foam collapse. An additional object of the present invention is to provide a process for producing polyvinyl chloride foam and compositions for use therein wherein the foam product has a high quality foam structure even though the heating for gelling and fusing may be non-uniform and the gelling and fusing conditions are not carefully controlled. Another object of the present invention is the provision of a process for producing polyvinyl chloride foam and compositions for use therein such that the process can be operated at normal humidities ranging from 10% relative humidity at 70° F. to 65% relative humidity at 95° F. A still further object of the invention is the provision of a process for the production of polyvinyl chloride foam and compositions for use therein wherein trace amounts of water can be tolerated but generally wherein water is absent from the plastisol.

Therefore, the present invention provides novel and highly useful polyvinyl chloride plastisols, a composite foam forming and foam stabilizing composition for incorporation therein, and a process for producing foam from the novel plastisol. The gist or heart of the present invention is the composite foam forming and foam stabilizing composition described in detail hereinafter and more particularly the foam stabilizer component thereof.

A polyvinyl chloride plastistol is a dispersion of finely divided polyvinyl chloride resin particles in liquid plasticizer for the polyvinyl chloride resin. Typical useful plastistol grade or dispersion stir-in type polyvinyl chloride resins include Geon 121 (a high molecular weight polyvinyl chloride stir-in type plastisol resin sold by the B. F. Goodrich Chemical Company), Exon 654 (a similar resin sold by the Firestone Plastic Company), Marvinol VR–50 and VR–53 (general purpose polyvinyl chloride plastistol resins sold by the Naugatuck Chemical Company), Opalon 410 (a polyvinyl chloride plastisol grade resin sold by the Monsanto Chemical Company) and Pliovic M–90. Where it is desired to reduce the fusing temperature, a portion, such as an amount up to about 30% by weight, of the vinyl chloride homopolymer resin can be replaced by or blended with a vinyl chloride copolymer plastistol resin, for example Geon 135 sold by the B. F. Goodrich Chemical Company.

The liquid plasticizer present in the plastistol as a dispersion medium for the polyvinyl chloride resin particles is used in varying amounts depending upon the nature of the plasticizer and the polyvinyl chloride resin. In general, the plasticizer is used in an amount from about 45 to about 150 parts by weight per 100 parts by weight of the polyvinyl chloride resin. Usually the plastisol will contain from about 54 to about 95 parts by weight of the plasticizer per 100 parts by weight of the polyvinyl chloride resin. Typical suitable plasticizers include dioctyl phthalate or di-(2-ethyl-hexyl) phthalate; butyl decyl phthalate; dicapryl phthalate; butyl benzyl phthalate; dioctyl adipate; dioctyl sebacate; tricresyl phosphate; trioctyl phosphate; cresyl diphenyl phosphate; acetyl tributyl citrate; dipropylene glycol dibenzoate; epoxy-type plasticizers, such as Monoplex S–73 (Rohm & Haas); polymeric plasticizers, such as Paraplex G–50 and Paraplex G–62 (Rohm & Haas); and butadiene acrylonitrile copolymers, such as Hycar 1312 (B. F. Goodrich Chemical Company). Generally, these plasticizers are used in conjunction with one another to form composite plasticizer systems.

The choice of plasticizer should take into consideration its effect on plastisol rheology and its ability to hold or release air. Experience has shown that a plastisol viscosity of 1500 to 10,000 cps., as measured on a Brookfield Viscometer at 30 r.p.m. with a No. 4 spindle can be used satisfactorily in the process of the invention. Below this lower viscosity, the efficiency of the plastisol to hold air is reduced. Above this upper viscosity, the problem of transferring the plastisol is increased materially.

The plastisol used must have the property of thinning out with stirring. Using a Brookfield Viscometer, flow properties can be checked by measurements at two spindle speeds. Thixotropic plastisols will show a reduction in viscosity at the higher spindle speed. Newtonian plastisols will give approximately equal readings at either speed. Both thixotropic and Newtonian plastisols are satisfactory for use in the process of the present invention. However, dilatant plastisols show an increase in viscosity at the higher spindle speed and are difficult to use in the process.

A good air release plasticizer required for many plastisol applications is not desirable for use in the present process, since the process of the invention functions by the mechanical entrapment of air in the plastisol. However, small amounts of excellent air release plasticizers can be used where specific properties are desired in the finished foam.

In addition to the dispersed phase, namely the plastisol grade polyvinyl chloride resin, and the dispersion medium, namely the liquid plasticizer, the polyvinyl chloride plastisols can contain, if desired, various conventional additives. Usually heat and light stabilizers are present which are lead, tin, zinc, cadmium and barium compounds or complexes, such as those stabilizers sold under the trade names Vanstay RZ 25, Vanstay HTA, Vanstay SA, Vanstay RR–Z and Vanstay 6060 (R. T. Vanderbilt Co.). The heat and light stabilizers are normally present in the plastisol in an amount from about 0.5 to about 6 parts by weight per 100 parts by weight of the polyvinyl chloride resin, and more usually in an amount from about 1.5 to about 3 parts by weight per 100 parts by weight of the polyvinyl chloride resin.

Fillers of the low oil absorption type are frequently employed in the plastisols to lower the cost of the finished foam and to modify its properties, typical fillers being calcium carbonate and talc or hydrous magnesium silicate. When fillers are employed in the plastisol, they are generally present in an amount up to about 100 parts by weight of the filler per 100 parts by weight of the polyvinyl chloride resin.

Where a colored or tinted polyvinyl chloride foam is desired, colorants or color-fast pigments are incorporated into the plastisol. The colorants or pigments will usually be present in the plastisol in an amount of about 1 part by weight per 100 parts by weight of the polyvinyl chloride resin.

As noted above, an essential component of the invention is an organic nonsoap surfactant characterized by its property or ability to act as a foaming agent for the plastisol when it is mechanically beaten or whipped to incorporate air therein. The organic nonsoap surfactant foaming agent is present in the plastisol in an amount from about 1 to about 6 parts, and usually in an amount from about 2.5 to about 4 parts, by weight per 100 parts by weight of the polyvinyl chloride resin.

Typical examples of such well known nonsoap surfactants capable of acting as foaming agents which can be used include sodium dodecyl benzene sulfonate, such as Siponate DS–10; polyoxyethylene oxypropylene stearate, such as Atlas G–2162; polyoxyethylene lauryl ether, such as Brij 30; tridecyloxypolyethyleneoxyethanol, such as Emulphogene BC–610; coconut oil alkanolamide, such as Foamole AR; modified coconut oil fatty amine condensate, such as Solar 25; octylphenoxy polyethyleneoxyethanol, such as Igepal CA–730; and diethanolamide vegetable oil, such as Promide A–3551.

The other essential component of the plastisol composition of the invention is a novel foam stabilizer which serves to stabilize the foam structure during the heating encountered in the gelling and fusing operations and thereby prevents foam collapse or coarsening. The foam stabilizer is present in the plastisol in an amount from about 0.5 to about 3.5 parts, and usually in an amount from about 1.5 to about 2 parts, by weight per 100 parts by weight of polyvinyl chloride resin. The foam stabilizer which is employed is potassium acid phthalate, sodium acid phthalate or sodium phthalate. Interestingly enough, it has been found that a closely related salt of phthalic acid, namely potassium phthalate, as well as esters of phthalic acid do not have the property of functioning as a foam stabilizer.

Trace amounts of water can be tolerated in the plastisol of the invention to lower the viscosity of the wet foam, if desired, although it is preferred that the plastisol be of a nonaqueous nature. When present, the water is in an amount from 0 to about 1, and usually from 0 to about 0.1, parts by weight per 100 parts by weight of resin. The fact that water in trace amounts can be tolerated in the plastisol of the invention enables the plastisol to be used at normal humidities ranging from 10% relative humidity at 70° F. to 65% relative humidity at 95° F. Moreover, the fact that the plastisol can tolerate such small amounts of water means that the components of the plastisol need not be dehydrated prior to use therein. However, where the foamed plastisol is to be gelled and fused between two vapor impermeable layers or surfaces, the nonaqueous plastisols should be employed. The liberation of water from the plastisol during the heating operation encountered in gelling and fusing causes blisters and improper adhesion of the plastisol foam to the vapor impermeable surfaces, such as paper, treated fabric, plastic or the like, used in the preparation of laminates.

A further desirable component of the plastisol is oleic acid which term as used herein includes the naturally occurring mixtures of fatty acids containing oleic acid, such as the naturally occurring mixtures of fatty acids derived from lard, peanut oil, tallow oil and corn oil. When present, the oleic acid is used in an amount from about 0.5 to about 5 parts, and usually in an amount from about 1.5 to about 2.5 parts, by weight per 100 parts by weight of polyvinyl chloride resin. The oleic acid serves to prevent the slight foam collapse which is generally encountered during gelling and fusing of plastisols which contain heat and light stabilizers.

Turning now to the composite foam forming and foam stabilizing composition of the invention, it comprises from about 1 to about 6 parts, and usually from about 2.5 to about 4 parts, by weight of an organic nonsoap surfactant foaming agent, as described above, and from about 0.5 to about 3.5 parts, and usually from about 1.5 to about 2 parts, by weight of the foam stabilizer described above. If desired, the composite foam forming and foam stabilizing composition can further contain from 0 to about 1 part, and usually from 0 to about 0.1 part, by weight of water; from about 0.5 to about 6 parts, and usually from about 1.5 to about 3 parts, by weight of the above mentioned heat and light stabilizers for polyvinyl chloride resin; and from about 0.5 to about 5 parts, and usually from about 1.5 to about 2.5 parts, by weight of the above mentioned oleic acid.

The composite foam former and foam stabilizer composition can be prepared, for example, by mixing the liquid heat and light stabilizer with the liquid oleic acid. The powdered organic nonsoap surfactant foaming agent can then be added slowly thereto while stirring and heating the blend until the temperature reaches about 230° F. The blend may then be cooled with stirring to 85–100° F. Thereupon, the freshly ground foam stabilizer (free from lumps) may be slowly added and the blend stirred until the foam stabilizer is completely dispersed therein and the liquid composite product is free from all agglomerates.

The liquid composite foam former and foam stabilizer composition is used in the process of the invention by mixing the above mentioned amounts of the components thereof with from about 45 to about 150, usually from about 54 to about 95, parts by weight of plasticizer and with about 100 parts by weight of a polyvinyl chloride resin in a high shear mixer to form a plastisol. The plastisol can be used immediately, or, if desired, it can be stored up to seven weeks or even longer, because it has substantially gel-free flow characteristics during storage.

The plastisol is mechanically beaten or frothed to incorporate air therein by using a Hobart batch mixer or preferably an Oakes continuous mixer or similar equipment to form a liquid or wet foam. Normal foaming temperature is from about 18° C. to about 35° C. After formation of the liquid foam into the desired shape by spreading on a surface or pouring into a mold, it is heated to a temperature from about 143° C. to about 185° C. for from about 30 seconds to about 4 hours to gel and fuse it. Gelation can be effected as a separate operation by heating to a temperature from about 60° C. to about 88° C. for from about 10 seconds to about 2 hours. During the gelation period the liquid foam containing discrete or closed air cells solidifies to a soft gel. Fusion can be obtained as a separate operation by further heating to a temperature from about 143° C. to about 185° C. for from about 20 seconds to about 4 hours. As fusion occurs, the discrete or closed cells become interconnecting or open cell and generally a semi-permeable skin forms on the foam. Radiofrequency or dielectric heating, radiant heat and circulating hot air heating are suitable for the gelling and fusing procedure. The temperature and time of heating, of course, will vary with the nature of the components present in the plastisol and the thickness and density of the foam. After heating, the fused or dry foam is cooled to room temperature.

The compositions and process of the invention are illustrated by the following examples.

EXAMPLES 1–13

The Masterbatch S or plastisol set forth below was prepared by blending together the polyvinyl chloride resin particles and plasticizers therefor by means of a Lightnin' mixer having a marine type down thrust propeller operated between 750 to 2050 r.p.m.

Masterbatch S

| Components: | Parts by weight |
| --- | --- |
| Polyvinyl chloride dispersion resin (Exon 654) | 100.0 |
| Butyl benzyl phthalate (a plasticizer) | 30.0 |
| Dioctyl phthalate (a plasticizer) | 30.0 |
| Epoxy-type plasticizer (Monoplex S-73) | 5.0 |
| Total | 165.0 |

The additives set forth in Table I below were added to Masterbatch S in the same equipment to provide the following Base Compound or plastisol.

Base Compound

| Components: | Parts by weight |
| --- | --- |
| Polyvinyl chloride dispersion resin (Exon 654) | 100.0 |
| Butyl benzyl phthalate (a plasticizer) | 30.0 |
| Dioctyl phthalate (a plasticizer) | 50.0 |
| Epoxy-type plasticizer (Monoplex S-73) | 5.0 |
| Total | 185.0 |

The powdered organic nonsoap surfactant foaming agent (sodium dodecyl benzene sulfonate) was melted and blended with a portion (7.5 parts) of the liquid dioctyl phthalate plasticizer to form an easily pourable liquid. In those nonaqueous plastisols the foaming agent-plasticizer blend was heated to 230° F. to drive off all traces of water from the foaming agent. The powdered foam stabilizer (normal or acid salt of phthalic acid) was ground for 6 hours in a pebble mill with a further portion (2–3 parts) of the liquid dioctyl phthalate plasticizer to insure a uniform dispersion. The liquid oleic acid, the liquid heat and light stabilizer (Vanstay 6060 which is a complex mixture of barium, cadmium and zinc compounds), the foaming agent-plasticizer blend, the foam stabilizer-plasticizer blend and another portion of dioctyl phthalate plasticizer (giving a total of 20 parts thereof which constitutes the difference between Masterbatch S and the Base Compound) were then added to the Masterbatch S to provide the Base Compound containing the various additives set forth in Table I below.

The resulting plastisols were separately foamed in a 10-M Oakes mixer at a pump throughput of 0.75 lb./min., a rotor speed of 100 r.p.m., incorporating air so that a back pressure of 45 p.s.i. was obtained. The foams were delivered through 12 feet of ½" internal diameter flexible tubing plus 3 feet of ¾" internal diameter flexible tubing. The foams were spread on release paper or bleached muslin in layers ¼" thick, gelled and fused between two 24" x 48" radiant heat panels, rated at one kilowatt per square foot with a heating element temperature of 800° F. for approximately 2–4 minutes. The panels were 10" apart and the foam was equally spaced therebetween. The foam product was then cooled to room temperature.

The wet foam density (density of the foam prior to gelling and fusing) and the dry foam density (density of the foam after gelling and fusing) were measured and also the appearance of the final foam product was noted and recorded. The various additives present in the representative foams and the amounts thereof, as well as the wet foam density, dry foam density and appearance of the foams are set forth in Table I.

Examples 1 through 3 in Table I above are comparative examples not within the scope of the present invention. Thus in comparative Example 1 the plastisol and foam produced therefrom contained a representative organic nonsoap surfactant foaming agent, namely sodium dodecyl benzene sulfonate, as well as esters of phthalic acid (plas-

TABLE I.—PARTS BY WEIGHT

| Example No | 1 | 2 | 3 | 4 | 5 | 6 | 7 | 8 | 9 | 10 | 11 | 12 | 13 |
| --- | --- | --- | --- | --- | --- | --- | --- | --- | --- | --- | --- | --- | --- |
| Sodium dodecyl benzene sulfonate | 2.5 | 2.4 | 2.5 | 2.5 | 2.5 | 2.5 | 2.5 | 2.4 | 2.5 | 2.5 | 2.5 | 2.4 | 2.5 |
| Water | | 0.1 | | | | | | 0.1 | | | | 0.1 | |
| Potassium phthalate | | | 2 | | | | | | | | | | |
| Potassium acid phthalate | | | | 0.5 | 1.0 | 1.5 | 2 | 2 | | | | | |
| Sodium acid phthalate | | | | | | | | | | 2 | | 2 | 2 |
| Sodium phthalate | | | | | | | | | 2 | | | | |
| Vanstay 6060 | | | | | | | | | | | 1.5 | 1.5 | 1.5 |
| Oleic acid | | | | | | | | | | | | | 2.5 |
| Wet foam density (lbs./cu. ft.) | 18.7 | 19.6 | 68.0 | 20.8 | 20.3 | 21.7 | 16.6 | 20.0 | 20.8 | 21.3 | 18.0 | 17.0 | 19.3 |
| Dry foam density (lbs./cu. ft.) | 21.3 | 24.2 | 60.6 | 20.0 | 19.4 | 20.7 | 16.2 | 17.1 | 21.1 | 20.2 | 19.3 | 17.2 | 19.3 |
| Foam appearance | (1) | (1) | (2) | (3) | (3) | (3) | (4) | (5) | (6) | (7) | (6) | (3) | (3) |

[1] Surface collapse.
[2] No foam.
[3] Fine and uniform.
[4] Essentially fine and uniform.
[5] Very fine and uniform.
[6] Reasonably fine and uniform.
[7] Fine, non-uniform.

ticizers). Although this foaming agent properly performed its function as a foaming agent in view of the fact that a satisfactory low wet foam density of 18.7 was obtained, the dry foam density increased to a value of 21.3 and the surface of the foam was collapsed thereby indicating the need for a foam stabilizer which was not provided by the esters of phthalic acid. In comparative Example 2 containing a foaming agent and a small amount of water as well as esters of phthalic acid (plasticizers) a wet foam was obtained having a satisfactory density of 19.6. However, this wet foam upon gelling and fusing had an increased dry foam density of 24.2 and showed surface collapse once again indicating the need for a foam stabilizer. Comparative Example 3 contained a foaming agent and potassium phthalate as a potential foam stabilizer. However, no foam was obtained with such a plastisol system in view of the fact that the wet foam density was an extremely high value of 68.0 and the dry foam density was an equally high value of 60.6.

Examples 4 through 13 in Table I above are all illustrative of the compositions and process of the invention. Examples 4 through 7 were nonaqueous plastisols containing composite foam former and foam stabilizer compositions having varying amounts of potassium acid phthalate as the foam stabilizer.

Example 8 is representative of an aqueous plastisol system containing potassium acid phthalate as the foam stabilizer. Examples 9 and 10 are representative of nonaqueous plastisol systems containing sodium acid phthalate and sodium phthalate respectively as the foam stabilizer.

Examples 11 through 13 illustrate the effect upon a plastisol system of a representative heat and light stabilizer (Vanstay 6060), with or without the presence of oleic acid. Thus Example 11 is a nonaqueous plastisol system while Example 12 is an aqueous plastisol system both of which contained a heat and light stabilizer (Vanstay 6060) and both of which showed acceptable slight foam collapse in view of the small increase in density in going from the wet foam to the dry foam. In the nonaqueous plastisol system of Example 13 which contained a heat and light stabilizer (Vanstay 6060) plus oleic acid there was no collapse during gelling and fusing as shown by the fact that the dry foam density was less than the wet foam density thereby demonstrating the beneficial foam stabilizing effect of oleic acid in a plastisol system containing a heat and light stabilizer in addition to the composite foaming agent and foam stabilizer combination of the invention.

Using the representative plastisol of Example 13 satisfactory laminates of textile/foam/textile or plastic sheet were obtained as well as acceptable foams having a thickness of only 15 to 45 mils. The process has also been satisfactorily operated at normal humidities ranging from 10% relative humidity at 70° F. to 65% relative humidity at 95° F.

The open cell vinyl foam product produced by the process of the invention can be used as padding for brassieres or insulation in a variety of wearing apparel applications ranging from comfortable, long lasting shoe linings and shoe insoles to simulated smooth and suede leather and weather shielding headwear. Uses as a cushioning and upholstery material include public seating in buildings, airplanes, buses, and subway or railway cars where flame resistance may be a required property. Good outdoor aging characteristics reveal its utility in equipment for patios, swimming pools, stadium cushions, and camping equipment. In fabricating articles for such applications, a non-porous plastisol coating may be deposited on the surface of the form before addition of the foamed material. Upon fusion, the protective non-porous skin adheres firmly to the underlying semi-permeable skin of the cellular structure.

Additional uses include safety padding for automotive, factory and sports use, sound insulation for automotive use, insulation of bridges against frost, and for gaskets.

It will be appreciated that various modifications and changes may be made in the invention in addition to those described above without departing from the spirit thereof and accordingly the invention is to be limited only within the scope of the appended claims.

What is claimed is:

1. An unfoamed plastisol especially adapted for the formation of an open cell polyvinyl chloride foam by the incorporation of air therein which comprises about 100 parts by weight of polyvinyl chloride resin particles dispersed in from about 45 to about 150 parts by weight of plasticizer therefor, from about 1 to about 6 parts by weight of an organic nonsoap surfactant foaming agent and from about 0.5 to about 3.5 parts by weight of a foam stabilizer selected from the group consisting of potassium acid phthalate, sodium acid phthalate and sodium phthalate.

2. The plastisol as defined by claim 1 which further contains from 0 to about 1 part by weight of water.

3. The plastisol as defined by claim 1 which further contains from 0.5 to about 6 parts by weight of a heat and light stabilizer for polyvinyl chloride resin.

4. The plastisol as defined by claim 3 which further contains from about 0.5 to about 5 parts by weight of oleic acid.

5. An unfoamed plastisol especially adapted for the formation of an open cell polyvinyl chloride foam by the incorporation of air therein which comprises about 100 parts by weight of polyvinyl chloride resin particles dispersed in from about 54 to about 95 parts by weight of plasticizer therefor, from about 2.5 to about 4 parts by weight of sodium dodecylbenzene sulfonate and from about 1.5 to about 2 parts by weight of potassium acid phthalate.

6. The plastisol as defined by claim 5 which further contains from 0 to about 0.1 part by weight of water.

7. The plastisol as defined by claim 5 which further contains from about 1.5 to about 3 parts by weight of a heat and light stabilizer for polyvinyl chloride resin.

8. The plastisol as defined by claim 7 which further contains from about 1.5 to about 2.5 parts by weight of oleic acid.

9. A composite foam forming and foam stabilizing composition especially adapted for promoting foam formation and preventing collapse thereof by the incorporation of air into an unfoamed polyvinyl chloride plastisol containing said composition which comprises from about 1 to about 6 parts by weight of an organic nonsoap surfactant foaming agent and from about 0.5 to about 3.5 parts by weight of a foam stabilizer selected from the group consisting of potassium acid phthalate, sodium acid phthalate and sodium phthalate.

10. The composition as defined by claim 9 which further contains from 0 to about 1 part by weight of water.

11. The composition as defined by claim 9 which further contains from about 0.5 to about 6 parts by weight of a heat and light stabilizer for polyvinyl chloride resin.

12. The composition as defined by claim 11 which further contains from about 0.5 to about 5 parts by weight of oleic acid.

13. A composition foam forming and foam stabilizing composition especially adapted for promoting foam formation and preventing collapse thereof by the incorporation of air into an unfoamed polyvinyl chloride plastisol containing said composition which comprises from about 2.5 to about 4 parts by weight of sodium dodecyl benzene sulfonate and from about 1.5 to about 2 parts by weight of potassium acid phthalate.

14. The composition as defined by claim 13 which further contains from 0 to about 0.1 part by weight of water.

15. The composition as defined by claim 13 which further contains from about 1.5 to about 3 parts by weight of a heat and light stabilizer for polyvinyl chloride resin.

16. The composition as defined by claim 15 which further contains from about 1.5 to about 2.5 parts by weight of oleic acid.

17. A process for producing an open cell polyvinyl chloride foam which comprises mixing together about 100 parts by weight of polyvinyl chloride resin particles, from about 45 to about 150 parts by weight of plasticizer therefor, from about 1 to about 6 parts by weight of an organic nonsoap surfactant foaming agent and from about 0.5 to about 3.5 parts by weight of a foam stabilizer selected from the group consisting of potassium acid phthalate, sodium acid phthalate and sodium phthalate to form a plastisol; mechanically beating or frothing air into the plastisol to form a liquid foam; shaping the liquid foam; heating the liquid foam to gel and fuse it, and cooling the fused foam to room temperature.

18. The process as defined by claim 17 wherein the plastisol further contains from 0 to about 1 part by weight of water.

19. The process as defined by claim 17 wherein the plastisol further contains from about 0.5 to 6 parts by weight of a heat and light stabilizer for polyvinyl chloride resin.

20. The process as defined by claim 19 wherein the plastisol further contains from about 0.5 to about 5 parts by weight of oleic acid.

21. A process for producing an open cell polyvinyl chloride foam which comprises mixing together about 100 parts by weight of polyvinyl chloride resin particles, from about 54 to about 95 parts by weight of plasticizer therefor, from about 2.5 to about 4 parts by weight of sodium dodecylbenzene sulfonate and from about 1.5 to about 2 parts by weight of potassium acid phthalate to form a plastisol; mechanically beating or frothing air into the plastisol to form a liquid foam; shaping the liquid foam; heating the liquid foam at a temperature from about 143° C. to about 185° C. for from about 30 seconds to about 4 hours to gel and fuse it, and cooling the fused foam to room temperature.

22. The process as defined by claim 21 wherein the plastisol further contains from 0 to about 0.1 part by weight of water.

23. The process as defined by claim 21 wherein the plastisol further contains from about 1.5 to about 3 parts by weight of a heat and light stabilizer for polyvinyl chloride resin.

24. The process as defined by claim 23 wherein the plastisol further contains from about 1.5 to about 2.5 parts by weight of oleic acid.

References Cited

UNITED STATES PATENTS

| 2,966,470 | 12/1960 | Maltenfort | 260—2.5 |
| 3,288,729 | 11/1966 | Waterman et al. | 260—2.5 |
| 3,301,798 | 1/1967 | Waterman et al. | 260—2.5 |

MURRAY TILLMAN, *Primary Examiner.*

MORTON FOELAK, *Assistant Examiner.*

U.S. Cl. X.R.

260—31.8, 30.6, 34.2, 31.2, 891, 41

UNITED STATES PATENT OFFICE
CERTIFICATE OF CORRECTION

Patent No. 3,432,449                                                       March 11, 1969

Kenneth M. Deal et al.

It is certified that error appears in the above identified patent and that said Letters Patent are hereby corrected as shown below:

Column 8, line 60, "composition" should read -- composite --. Column 9, line 20, before "6" insert -- about --.

Signed and sealed this 31st day of March 1970.

(SEAL)
Attest:

Edward M. Fletcher, Jr.

Attesting Officer

WILLIAM E. SCHUYLER, JR.

Commissioner of Patents